(12) United States Patent
Fudaba et al.

(10) Patent No.: US 7,875,679 B2
(45) Date of Patent: Jan. 25, 2011

(54) POLYPROPYLENE RESIN COMPOSITION AND FILM THEREOF

(75) Inventors: Tetsuya Fudaba, Saitama (JP); Nobuyuki Mitarai, Yokohama (JP); Katsuharu Tagashira, Yokohama (JP)

(73) Assignee: Bassell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/507,251

(22) PCT Filed: Mar. 10, 2003

(86) PCT No.: PCT/EP03/02633

§ 371 (c)(1), (2), (4) Date: Sep. 10, 2004

(87) PCT Pub. No.: WO03/076510

PCT Pub. Date: Sep. 18, 2003

(65) Prior Publication Data

US 2005/0165166 A1 Jul. 28, 2005

(30) Foreign Application Priority Data

Mar. 14, 2002 (JP) ............................... 2002-069957

(51) Int. Cl.
- C08L 33/00 (2006.01)
- C08L 33/04 (2006.01)
- C08L 33/10 (2006.01)

(52) U.S. Cl. ....................................... 525/191; 525/240

(58) Field of Classification Search ................. 525/191, 525/240

See application file for complete search history.

(56) References Cited

U.S. PATENT DOCUMENTS

| | | |
|---|---|---|
| 4,769,510 A | 9/1988 | Kaminsky et al. |
| 4,952,649 A | 8/1990 | Kooka et al. |
| 5,100,981 A | 3/1992 | Schreck et al. |
| 5,416,178 A | 5/1995 | Winter et al. |
| 5,539,067 A | 7/1996 | Parodi et al. |
| 5,618,771 A | 4/1997 | Parodi et al. |
| 5,629,254 A | 5/1997 | Fukuoka et al. |
| 5,658,997 A | 8/1997 | Fukuoka et al. |
| 5,661,096 A | 8/1997 | Winter et al. |
| 5,679,812 A | 10/1997 | Winter et al. |
| 5,705,584 A | 1/1998 | Fukuoka et al. |
| 5,710,223 A | 1/1998 | Fukuoka et al. |
| 5,723,640 A | 3/1998 | Fukuoka et al. |
| 5,846,896 A | 12/1998 | Ewen |
| 5,869,723 A | 2/1999 | Hinokuma et al. .......... 556/402 |
| 5,936,053 A | 8/1999 | Fukuoka et al. |
| 6,017,841 A | 1/2000 | Winter et al. |
| 6,117,957 A | 9/2000 | Ewen |
| 6,172,168 B1 | 1/2001 | Winter et al. |
| 6,191,219 B1 * | 2/2001 | Tanaka et al. ................. 525/95 |
| 6,194,342 B1 | 2/2001 | Parodi et al. |
| 6,255,390 B1 | 7/2001 | Enomoto et al. |
| 6,344,577 B1 | 2/2002 | Ewen |
| 6,515,085 B1 | 2/2003 | Parodi et al. |
| 6,649,712 B2 | 11/2003 | Ewen |
| 6,696,520 B1 | 2/2004 | Pellegatti et al. |
| 6,777,508 B1 | 8/2004 | Parodi et al. |
| 6,872,790 B2 | 3/2005 | Ewen |
| 2002/0193537 A1 | 12/2002 | Ewen ......................... 526/150 |

FOREIGN PATENT DOCUMENTS

| | | |
|---|---|---|
| EP | 0844280 | 5/1998 |
| EP | 0936247 | 8/1999 |
| EP | 0976785 | 2/2000 |
| GM | 9719959 | 6/1997 |
| JP | 57063310 | 4/1982 |
| JP | 57063311 | 4/1982 |
| JP | 58083006 | 5/1983 |
| JP | 58138708 | 8/1983 |
| JP | 61130314 | 6/1986 |

(Continued)

OTHER PUBLICATIONS

R.Lieberman et al. "Polypropylene", Abstract and Article, Kirk-Othmer Encyclopedia of Chemical Technology, Mar. 2006.*

T. Tsutsui et al., "Propylene homo- and copolymerization with ethylene using an ethylenebis (1-indenyl) zirconium dichloride and methylaluminoxane catalyst system;" *Polymer*, vol. 30, p. 1350-1356 (1989).

R. Lew et al., "Quantitative Size Exclusion Chromatography of Polypropylene I: Method Development;" *Journal of Applied Polymer Science*, vol. 35, p. 1049-1063 (1988).

K. Soga et al., "Copolymerization of ethylene and propylene with a $CpTiCl_3/SiO_2$-MAO catalyst system;" *Polymer Communications*, vol. 32(10), p. 310-313 (1991).

(Continued)

*Primary Examiner*—Nathan M Nutter
(74) *Attorney, Agent, or Firm*—Shao-Hua Guo; Jarrod N. Raphael

(57) ABSTRACT

A polypropylene resin composition comprising 40 to 80% of a polypropylene component (A) comprising a copolymer of propylene with ethylene and/or a $C_{4-12}$ α-olefin, or a homopolymer of propylene, and 20 to 60% of a copolymer component (B) containing copolymer (B-1) and copolymer (B-2), wherein both (B-1) and (B-2) are copolymers of propylene with ethylene and/or a $C_{4-12}$ α-olefin, in (B-1) the amount of units derived from propylene is more than 50% to 85%, and in (B-2) the amount of units derived from propylene is 15 to 50%, the molecular weight distribution is 3.0 or less, and blockness is 1.3 or less; in which composition the amount of (B-2) is 3% or more, and the ratio of the limiting viscosity of (B-1) to the viscosity of (A). is 1.5 or less, and the ratio of the limiting viscosity of (B-1) to the viscosity of (B-2) is 0.8 or more.

7 Claims, 1 Drawing Sheet

FOREIGN PATENT DOCUMENTS

| | | |
|---|---|---|
| JP | 61296006 | 12/1986 |
| JP | 62020507 | 1/1987 |
| JP | 63295607 | 12/1988 |
| JP | 1051408 | 2/1989 |
| JP | 1275609 | 11/1989 |
| JP | 2070708 | 3/1990 |
| JP | 3033103 | 2/1991 |
| JP | 2229806 | 9/1991 |
| JP | 6313048 | 11/1994 |
| JP | 7501573 | 2/1995 |
| JP | 7196734 | 8/1995 |
| JP | 7286020 | 10/1995 |
| JP | 8027238 | 1/1996 |
| JP | 8073532 | 3/1996 |
| JP | 8283343 | 10/1996 |
| JP | 11029689 | 2/1999 |
| WO | 93/11172 | 6/1993 |
| WO | 9311172 | 6/1993 |
| WO | 9640796 | 12/1996 |
| WO | 9641808 | 12/1996 |
| WO | WO 98/37144 | 8/1998 |

OTHER PUBLICATIONS

T. Takeuchi et al., "Gel Chromatography (Elementary Courst)," Section 3.1.3; published by Kodansha; p. 111-113 (1972).

"Copolymerization I; Analysis of Reaction;" Section 1.1.2, edited by the Society of Polymer Science, Japan, published by Baifukan; p. 5-13 (1975).

* cited by examiner

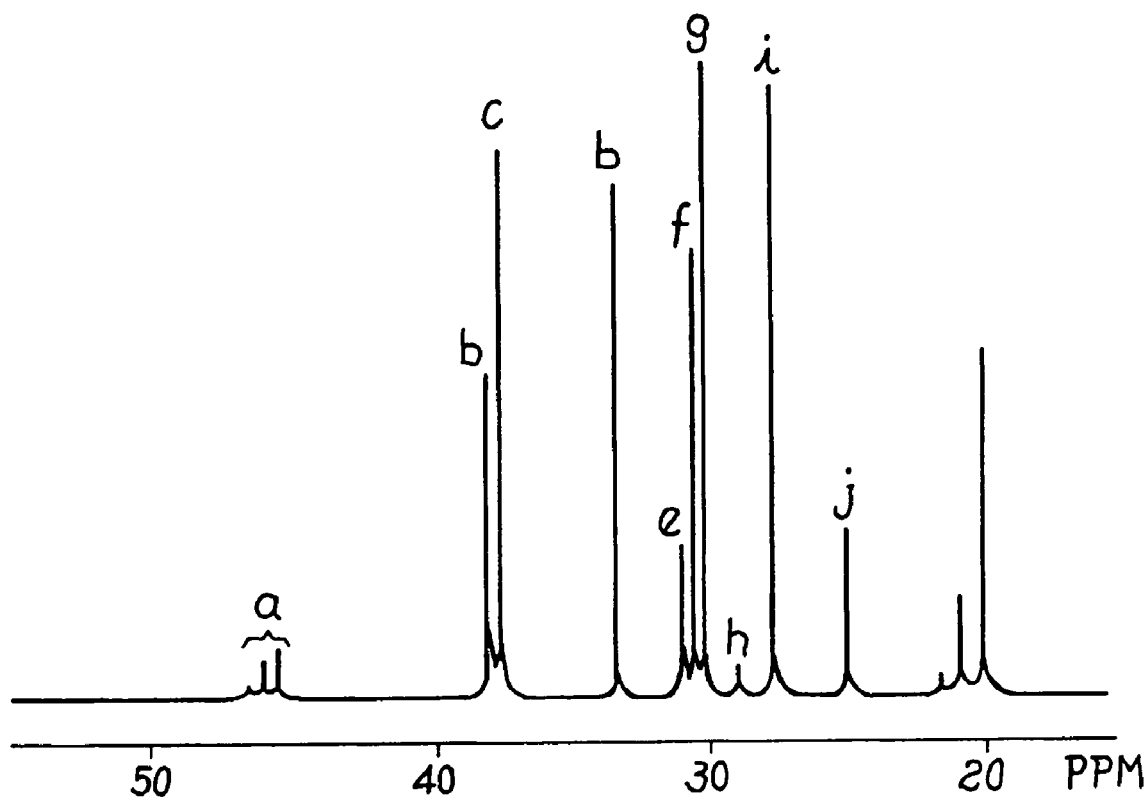

POLYPROPYLENE RESIN COMPOSITION AND FILM THEREOF

This application is a national stage entry continuation filed under 35 USC 371 of PCT/EP03/02633, filed Mar. 10, 2003.

The present invention relates to a polypropylene resin composition and a molding thereof. More particularly, the invention relates to a polypropylene resin composition which is not affected by molding machines and molding conditions upon molding, does not generate fish eye and the like, shows excellent appearance and transparency and is excellent in impact resistance at low temperatures, heat resistance and rigidity, and to a film thereof.

A molding where a propylene polymer (a homopolymer of propylene, a copolymer of ethylene with propylene and a block copolymer of ethylene with propylene) is used is of good economy and has been used in various fields. However, although a molding where a homopolymer of propylene is used usually has a high rigidity, it has a disadvantage of poor impact resistance, particularly poor impact resistance at low temperatures. Therefore, many proposals have been made for improving the impact resistance at low temperatures. Those proposals generally relate to that a homo component of propylene is at first produced and, after that, components for a random copolymer of ethylene with propylene are introduced whereupon a block copolymer of propylene is manufactured. Since moldings where a propylene block copolymer is used have an excellent impact resistance at low temperatures, they are widely used in various industrial fields such as automobiles and home electric appliances.

In the field of film, however, although a propylene block copolymer has excellent impact resistance at low temperatures and rigidity, it has a poor transparency and involves a disadvantage that its use is limited.

In order to solve such a disadvantage, various investigations have been carried out, and propylene block copolymers where the specific viscosity and the ethylene/propylene copolymer amount are controlled are disclosed in Japanese Patent Laid-Open Nos. 313048/1994, 286020/1995 and 27238/1996. However, even in such improved products, there are still problems that the impact resistance and the transparency are not fully achieved depending upon the molding machines and molding conditions.

Further, in Japanese Patent Laid-Open No. 29689/1999, there is disclosed a resin composition comprising an olefin or a styrene elastomer having specific MFR ratio and viscosity ratio to a propylene block copolymer and a homo part of the propylene block copolymer. However, there is a problem that within the specific MFR ratio and viscosity ratio, the resin composition is affected by molding machine and molding condition, whereby the impact resistance and the transparency are not fully achieved.

The present inventors made extensive investigations in view of the problems in the prior art as mentioned above. As a result, it has been found that when a specific rubber component is introduced into a specific controlled polypropylene resin composition, it is possible to prepare a resin composition having excellent transparency, rigidity and impact resistance.

That is, the invention is to provide a polypropylene resin composition which is not affected by molding machines and molding conditions upon molding, does not generate fish eye and the like, shows excellent appearance and transparency and is excellent in impact resistance at low temperatures, heat resistance and rigidity.

The invention therefore provides a polypropylene resin composition which comprises:

40 to 80% by weight of a polypropylene component (A) comprising a copolymer of propylene with ethylene and/or a $C_{4-12}$ α-olefin wherein the unit derived from ethylene and/or a $C_{4-12}$ α-olefin is 5% by weight or less or a homopolymer of propylene, and 20 to 60% by weight of copolymer components (B) containing a copolymer (B-1) and a copolymer (B-2), wherein
both the copolymer (B-1) and copolymer (B-2) are copolymers of propylene with ethylene and/or a $C_{4-12}$ α-olefin,
in the copolymer (B-1), the unit derived from propylene is from more than 50% by weight to 85% by weight, and
the copolymer (B-2) is a propylene copolymer where the unit derived from propylene is 15 to 50% by weight, the molecular weight distribution (Mw/Mn) by gel permeation chromatography is 3.0 or less, and blockness (Comonomer Sequence Distribution, hereinafter called CSD) determined using the measured NMR values is 1.3 or less, and its ratio occupying the whole polypropylene resin composition is 3% by weight or more.

BRIEF DESCRIPTION OF THE DRAWINGS

FIG. 1 is a $^{13}$C-NMR spectral chart used for the measurement of CSD.

In the invention, the polypropylene component (A) is a homopolymer of propylene or a copolymer of propylene with ethylene and/or a $C_{4-12}$ α-olefin where the unit derived from ethylene and/or a $C_{4-12}$ α-olefin is 5% by weight or less. The $C_{4-12}$ α-olefin is a αolefin such as 1-butene, 1-pentene, 1-hexene, 1-heptene, 1-octene, 1-decene and 4-methyl-1 pentene. The unit derived from monomer other than propylene in the polypropylene component (A) is 5% by weight or less. Each of those polymers may be used solely, or two or more thereof may be used jointly. Those polymers are manufactured by a known polymerization method using, for example, a known Ziegler-Natta catalyst or metallocene catalyst.

When rigidity and heat resistance are particularly required, the polypropylene component (A) is preferably a propylene homopolymer, while when the impact resistance and the transparency are particularly required, it is preferably a copolymer of propylene with ethylene and/or an α-olefin. When the component (A) is the above-mentioned propylene copolymer, the unit derived from ethylene and/or a $C_{4-12}$ α-olefin therein is 5% by weight or less, and preferably 0.1 to 3.5% by weight or less. When the unit derived from ethylene and/or a $C_{4-12}$ α-olefin is more than 5% by weight, the rigidity and the heat resistance in the molding may be lowered.

When the polypropylene component (A) has a intrinsic viscosity [η]A of 2.0 to 4.8 dl/g, it is preferred since it is hardly affected by molding conditions giving further improved transparency, rigidity and impact resistance of the molding. Here, the intrinsic viscosity is a value measured in decalin at 135° C. The intrinsic viscosity [η]A of the polypropylene component (A) is more preferably within a range of 2.5 to 4.5 dl/g, and still more preferably within a range of 2.8 to 4.0 dl/g.

Melt flow rate of the polypropylene component (A) is preferably within a range of 0.3 to 15 g/10 minutes, and more preferably within a range of 0.5 to 5 g/10 minutes. When the melt flow rate is within such a range, transparency, rigidity and impact resistance of the molding are further improved being hardly affected by the molding conditions and that is preferred. Incidentally, the melt flow rate of the polypropylene component (A) in the invention is a value measured at 230° C. with a load of 2.16 kg in accordance with JIS K7210, which may be hereinafter referred to as MFR.

It is preferred that the stereoregularity of the polypropylene component (A) is 96% or more. When the stereoregularity is 96% or more, a balance between rigidity and impact resistance of the molding is further improved, and hence, such is preferred. More preferably, it is 97% or more, and particularly preferably 98% or more.

Amount of the component (A) in the polypropylene resin composition of the invention is within a range of 40 to 80% by weight, more preferably 50 to 80% by weight, and still more preferably 60 to 80% by weight. When the amount of the component (A) is less than 40% by weight, although the impact resistance is improved, rigidity may be lowered, while when it is more than 80% by weight, the rigidity is improved, but the impact resistance may be lowered upon being affected by the molding conditions.

The copolymer component (B) contains the following copolymer (B-1) and the copolymer (B-2) mentioned below. The copolymer (B-1) and the copolymer (B-2) are copolymers of propylene with ethylene and/or a $C_{4-12}$ α-olefin.

The $C_{4-12}$ α-olefin which is a copolymer component is an α-olefin such as 1-butene, 1-pentene, 1-hexene, 1-heptene, 1-octene, 1-decene and 4-methyl-1-pentene. Preferably, both of the copolymer (B-1) and the copolymer (B-2) are copolymers of propylene with ethylene.

The unit derived from propylene in the copolymer (B-1) is from more than 50% by weight but not exceeding 85% by weight, and preferably 55 to 85% by weight. When it is more than 85% by weight, the impact resistance at low temperatures is insufficient, while when it is 50% by weight or less, the fluidity of the powder produced by the polymerization is poor, and such is a problem in the manufacture of the block copolymer.

It is preferred that the intrinsic viscosity [η]B-1 of the copolymer (B-1) is 1.4 to 5.0 dl/g. When it is more than 5.0 dl/g, although the impact resistance is improved, the transparency may be lowered. When it is less than 1.4 dl/g, the impact resistance may be lowered. The intrinsic viscosity [η]B-1 is more preferably within a range of 2.0 to 4.5 dl/g, and still more preferably 2.5 to 4.0 dl/g.

The copolymer (B-2) contains 15 to 50% by weight, and preferably 20 to 40% by weight of the unit derived from propylene.

In the copolymer (B-2), the molecular weight distribution (Mw/Mn) by gel permeation chromatography is 3.0 or less, preferably 2.8 or less, and more preferably 2.6 or less. A blockness (CSD) measured using the measured value of NMR is 1.3 or less, preferably 1.0 or less, and more preferably 0.8 or less.

When the ratio of the copolymer (B-2) to the total amount of the polypropylene resin composition of the invention is 3% by weight or more, the total length of the dispersed layer of the component (B) containing the copolymers (B-1) and (B-2) is desirably maintained even under a high shearing upon molding resulting in maintenance of the impact resistance or an improvement thereof. The ratio of the copolymer (B-2) to the total polypropylene resin composition of the invention is preferably 5% by weight or more, and more preferably from 7% by weight to 25% by weight.

It is preferred that the intrinsic viscosity [η]B-2 of the copolymer (B-2) is 0.5 to 6.0 dl/g. The intrinsic viscosity is more preferably within a range of 1.0 to 5.0 dl/g, and still more preferably 1.0 to 4.0 dl/g. When the intrinsic viscosity [η]B-2 is less than 0.5 dl/g, physical properties such as impact resistance are apt to be affected by the molding condition, or the impact resistance may be lowered. When it is more than 6.0 dl/g, the transparency may be lowered. It is preferred that the copolymer (B-2) has a heterologous bond. In the present specification, a heterologous bond amount means the existing ratio of the heterologous (regioirregular) bond amount caused by 2,1-insertion reaction and 1,3-insertion reaction in a polypropylene molecular chain measured by $^{13}$C-NMR spectrum on the basis of a method proposed by Tsutsui, et al. (*Polymer*, 30, 1350, 1989).

The viscosity ratio ([η]B-1/[η]A) of the copolymer (B-1) to the polypropylene component (A) in the invention is 1.5 or less, preferably 1.3 or less, and more preferably 1.2 or less. When it is 1.5 or less, the impact resistance at low temperatures is further improved, and the transparency is improved as well whereby that is preferred.

The ratio ([η]B-1/[η]B-2) of the intrinsic viscosity ([η]B-1) of the copolymer (B-1) to the intrinsic viscosity ([η]B-2) of the copolymer (B-2) is 0.8 or more, preferably within a range of 0.9 to 5.0, and more preferably within a range of 1.1 to 4.0. When it is less than 0.8, the transparency may be lowered. In view of the impact resistance, it is particularly preferred that the ratio is 4.0 or less.

The case where the weight of the copolymer (B-1) is more than that of the copolymer (B-2) in the copolymer component (B) is preferred in view of bonding force at the interface between the polypropylene component (A) and the copolymer component (B) dispersed therein in layers or as needles whereby the layer structure is stabilized. Their ratio by weight [(B-1)/(B-2)] is preferably within a range of 1.2 to 6.0, more preferably 1.5 to 5.0, and still more preferably 1.8 to 4.0.

Now, there will be illustrated a method for the manufacture of a resin composition comprising the polypropylene component (A) and the copolymer component (B) containing the copolymer (B-1) and the copolymer (B-2) according to the invention.

Each of the component (A) and the copolymers (B-1) and (B-2) may be manufactured separately, followed by mixing. Also, they may be manufactured in a polymerization system by means of a multi-stage polymerization method. Also, the both may be combined.

For example, each of the copolymer (B-1) and the copolymer (B-2) may be manufactured separately and then mixed with the separately manufactured component (A), or the copolymer (B-1) and the copolymer (B-2) may be manufactured by a multi-stage polymerization method, followed by mixing with the component (A).

Alternatively, the component (A) and the copolymer (B-1) are manufactured by a multi-stage polymerization method in a polymerization system and then mixed with the separately manufactured copolymer (B-2). Still alternatively, the component (A) and the copolymer (B-2) are manufactured by a multi-stage polymerization method in a polymerization system and then mixed with the separately manufactured copolymer (B-1).

Preferably, the component (A) and the copolymer (B-1) of the component (B) are manufactured by a multi-stage polymerization method in a polymerization system, and the resulting block copolymer is then mixed with the copolymer (B-2).

The polypropylene component (A), the copolymer (B-1) and the copolymer (B-2) may be manufactured using a known catalytic system. When the polymerization is carried out by means of multiple stages, each of the catalytic systems used in each of the stages may be different.

In the manufacture of the component (A) and the component (B) constituting the polypropylene resin composition of the invention, the component (A) and the component (B) are specified as the matters which are insoluble and soluble in xylene, respectively in case all of or a part of the component (A) and all of or a part of the component (B) are manufactured in a polymerization system by means of a multi-stage polymerization method. Specifically, the polymer obtained by the multi-stage polymerization is once dissolved in o-xylene of 135° C. and then cooled down to 25° C. to separate a polymer. The component which is separated out therefrom is called a xylene-insoluble matter while that dissolved therein is called a xylene-soluble matter. The xylene-soluble matter is re-precipitated with ethanol and recovered. The xylene-insoluble matter is the component (A) while the xylene-soluble matter is the component (B), and each of them is subjected to various measurements.

Manufacture of the polymer constituting the polypropylene resin composition of the invention may be carried out by a slurry method which is carried out in the presence of an inert hydrocarbon such as hexane, heptane or kerosene or a liquefied α-olefin such as propylene, a gas-phase polymerization method in the absence of a solvent, etc. under the conditions of a temperature of from room temperature to 130° C., and preferably 50 to 90° C. and a pressure of 2 to 50 kg/cm². With regard to a reactor in the polymerization step, those which have been usually used in the said art may be appropriately utilized. For example, a reactor of a stirred layer type, a reactor of a fluidized bed type or a reactor of a circulation type may be used and a method of any of continuous system, semi-batch system and batch system may be applied.

The catalytic system used for the manufacture of each polymer may be known one. Specifically, polymerization may be carried out using a Ziegler catalytic system or a metallocene catalytic system.

With regard to the Ziegler type catalyst, there may be exemplified a titanium trichloride catalyst and a magnesium-supported titanium catalyst, and with respect to the magnesium-supported titanium catalyst, there may be exemplified known catalytic systems comprising (a) a solid catalytic component containing titanium, magnesium and halogen as essential components, (b) an organoaluminum compound and (c) an electron-donating compound (the third component). Specifically, there may be used the catalytic systems mentioned in Japanese Patent Laid-Open Nos. 63310/1982, 63311/1982, 83006/1983, 138708/1983, 20507/1987, 296006/1986, 229806/1990, 33103/1990 and 70708/1990.

With regard to the metallocene catalytic system, there may be exemplified the catalysts comprising (d) a metallocene compound, (e) a promoter and, upon necessity, (f) an organometallic compound and, with respect to the metallocene compound referred to as (d), known ones may be used. The promoter (e) may be at least one compound selected from a group consisting of (e-1) an organoaluminum oxy compound and (e-2) an ionic compound.

With regard to the organometallic compound (f), there may be exemplified an organoaluminum compound, an organolithium compound, an organozinc compound and an organomagnesium compound and two or more thereof may be used as well. Preferred one is an organoaluminum compound. With regard to an organoaluminum compound, that which contains one or more hydrocarbon groups having from 1 to 20 carbons may be exemplified and its examples are alkylaluminums, dialkylaluminums and trialkylaluminums.

With regard to the metallocene catalytic system, there may be used the catalytic systems mentioned, for example, in Japanese Patent Laid-Open Nos. 130414/1986, 295607/1988, 51408/1989 and 275609/1989, WO 96/41808, Japanese Patent Laid-Open No. 501573/1995, WO 96/40796 and WO 97/19959.

There is no particular limitation for the single- or multi-stage polymerization method, but any of a slurry polymerization method, a gas-phase polymerization method, a bulk polymerization method, a solution polymerization, a suspension polymerization, etc. may be used. When a commonly used chain-transfer agent such as hydrogen is used in the polymerization, it is possible to adjust the molecular weight of the resulting polymer.

When a polymerization solvent is used, there may be used aromatic hydrocarbons such as benzene, toluene, xylene and ethylbenzene; alicyclic hydrocarbons such as cyclopentane and cyclohexane; aliphatic hydrocarbons such as pentane, hexane, heptane and octane; and halogenated hydrocarbons. Each of those solvents may be used solely, or two or more thereof may be used jointly.

It is also possible to use a monomer such as α-olefin as a solvent. Incidentally, in some polymerization methods, there may be carried out without the solvent.

The ratio of the metallocene compound (d) to the organoaluminum oxy compound (e-1) used in the polymerization is preferably to be selected so as to make the molar ratio of the organoaluminum oxy compound (based on aluminum atoms) to the transition metal compound usually within a range of 1 to 10,000. In view of the activity, economy and quality of the polymer, the preferred molar ratio is 10 to 5,000, and more preferably 20 to 2,000.

With regard to the ratio of the metallocene compound (d) to the ionic compound (e-2) in use is preferably to make 0.05 to 100 moles of the ionic compound (e-2) to one mole of the metallocene compound (d). More preferably, it is 0.1 to 50 moles, and furthermore preferably 1 to 10 moles.

The ratio of the organometallic compound (f) used to one mole of the metallocene compound (d) is usually preferred to be within a range of 1 to 100,000 moles, and more preferably within a range of 10 to 50,000 moles.

Before the main polymerization, preliminary polymerization may be carried out as well. With regard to the preliminarily-polymerized monomer in that case, those which are listed as constituting monomers hereinabove may be used.

With regard to a method for mixing the polymer components constituting the polypropylene resin composition of the invention, there may be used known methods. An example is a method where the components are mixed using a ribbon blender, a tumbler, a Henschel mixer, etc., followed by subjecting to melting and mixing using a kneader, a mixing roll, a Bumbury mixer extruder, etc. The temperature for the melting and mixing is preferably to be 170 to 280° C., and more preferably 190 to 260° C.

The polypropylene resin composition of the invention may be compounded with other additives which have been commonly used to thermoplastic resin within a range such that the object of the invention is not deteriorated. Examples of such additives are antioxidants, weather-resisting stabilizers, anti-static agents, lubricants, anti-blocking agents, anti-clouding agents, dyes, pigments, oils and waxes.

The resin composition of the invention may be made into film, sheet, tube, bottle, etc. by known molding methods. Moreover, the resin composition may be used solely or may be used by layering with other materials.

With regard to a method for the manufacture of film and sheet, there may be exemplified conventionally known water-cooling or air-cooling extrusion inflation method and T-die method. When layered with other materials, it is also possible to use the above-mentioned co-extrusion method, and further, dry lamination method, extrusion lamination method, etc.

With regard to a method for the manufacture of tube, there may be exemplified a common extrusion hollow molding method. The tube may be made into appropriate thickness and diameter according to the applied field.

In the molding which is prepared by molding the resin composition of the invention, the copolymer component (B) is dispersed either in layers or as needles in the polypropylene component (A), and an average length (aL) of the dispersed copolymer component (B) is 1.5 μm or longer.

The aL is preferably 1.6 μm or longer, more preferably 1.7 μm or longer, and still more preferably 1.8 μm or longer.

When the aL is shorter than 1.5 μm, the impact resistance and the transparency may be lowered.

An aspect ratio of the above-mentioned copolymer component (B) which is dispersed in layers or as needles is usually 3.0 or more, more preferably 5.0 or more, and still more preferably 8.0 or more. When the aspect ratio is 3.0 or more, the impact resistance and the transparency are particularly good.

In the invention, the dispersed structure of the above-mentioned layers may be near the surface of the molding, but especially when it is throughout the whole area, that is preferred since the mechanical strength is far better.

The invention will now be further illustrated by way of the following Examples although the invention is not limited to those Examples at all.

EXAMPLES

1. Measurement of Various Physical Properties:
Various physical properties mentioned in the Examples were measured as follows.

1) Molecular Weight Distribution:
Molecular weight distribution (Mw/Mn) which is a ratio of a weight-average molecular weight (Mw) to a number-average molecular weight (Mn) by gel permeation chromatography (hereinafter, abbreviated as "GPC") is defined to be as follows. Thus, a series of mono-dispersed standard polystyrenes where the molecular weights are known are subjected to a GPC measurement and then an equation (hereinafter, referred to as "calibration curve") showing the relation between molecular weight and eluting time of the polystyrene is formed. On the basis of the equation showing the relation between intrinsic viscosity and molecular weight for polystyrene and polypropylene mentioned in R. Lew, D. Suwanda, S. T. Balke, *J. Appli. Polm. Sci., Vol.* 35, pages 1049-1063 (1988), an equation for the calculation of molecular weight of polypropylene from molecular weight of polystyrene was formed. From the data of the GPC measurement for polypropylene, molecular weight is calculated using the calibration curve and then weight-average molecular weight (Mw) and number-average molecular weight (Mn) of polypropylene are determined using the molecular weight calculation equation. Specifically, the measurement can be carried out using a GPC apparatus of type 150 C manufactured by Waters where two Shodex HT-806M columns (manufactured by Showa Denko) are connected in series. The molecular weight of the copolymer is determined as such, then weight-average molecular weight (Mw) and number-average molecular weight (Mn) are determined using the following molecular weight calculation equation and, from that data, molecular weight distribution (Mw/Mn) is determined.

$$Mpp = 0.931 \times Mps^{0.973}$$

Mpp: molecular weight of polypropylene at a certain eluting time
Mps: molecular weight of polystyrene at the same eluting time Incidentally, such a method for the calculation of molecular weight is mentioned in detail in Tsuguo Takeuchi and Sadao Mori, *Gel Chromatography <Elementary Course>*, published by Kodansha (1972).

2) Measurement of Average Length La and Aspect Ratio of the Layer of the Copolymer Component (B):
The average length La and the aspect ratio are obtained by the image analysis of the picture under a scanning electron microscope (hereinafter, abbreviated as "SEM").

Taking the picture under SEM:
The observed image is obtained in a manner such that a film is embedded in an epoxy resin, the surface to be observed is made flat using a cutter, the resulting sample is subjected to an etching using xylene, gold is vapor-deposited thereon and the product is observed under the SEM. Usually, in the SEM picture prepared as such, the part where the copolymer component (B) removed by etching was present is observed as a dark area while the part where the polypropylene component (A) of the matrix is observed as a bright area.

Image Processing:
Now, there will be explained a method where the average length La of the copolymer component (B) is determined using an image analyzer.

The SEM picture in a plane parallel to the MD (in the mobile direction of the resin upon molding) of the T die film prepared according to the above is used, and the measurement can be done using a high-precision monitor particle analyzing package of type TOSPI-U manufactured by Toshiba Corporation, which is a commercially available image processing device. Specifically, a shaded image of the SEM picture is read in an analyzing device, and the conversion is made to two-value image where the copolymer component (B) is converted to black while the polypropylene component (A) is converted to white. For each particle, a distance between any two points on outer surface of the black part is taken, and among the distances, the longest one is defined as a maximum length (L) of the particle, while the distance vertical to L is defined as a thickness (T), and the maximum length of the average of all measured particles is defined as an average length (aL). At the same time, the average of the ratio of L to T for each particle is defined as an average aspect ratio.

3) Melt Flow Index (MFR):
This is a value according to JIS K7210 under the condition of temperature of 230° C. and load of 2160 g.

4) Stereoregularity:
In the invention, a triad tacticity fraction [mm] (%) of three chains of propylene unit shows the rate of mm in the structure of three chains of total polypropylene unit. Thus, in three chains of each propylene unit in $^{13}$C-NMR, the calculation is done by determining the peak area derived from methyl group in propylene of the second unit. For example, in the case of propylene homopolymer, calculation may be done according to a method mentioned in Japanese Patent Laid-Open No. 19634/1995, while in the case of propylene copolymer, the calculation may be done according to a method mentioned in Japanese Patent Laid-Open Nos. 73532/1996 and 283343/1996.

5) Measurement of $^{13}$C-NMR:
The measurement was carried out by JNM-GSX 400 manufactured by JEOL Ltd.

Measuring mode: a proton decoupling method, pulse width: 8.0 μs, pulse repeating time: 3.0 s, integrated times: 10,000 times, measurement temperature: 120° C., internal standard: hexamethyl disiloxane, solvent: 1,2,4-trichlorobenzene/benzene-d6 (volume ratio: 3/1), sample concentration: 0.1 g/ml.

6) Triad Tacticity Fraction [mm] of Three Chains of Propylene Unit:
The calculation was done by the following equation from the measured result of $^{13}$C-NMR by referring to the method mentioned in Japanese Patent Laid-Open No. 19634/1995.

$$[mm] = 100 \times I_{mm}/I_{CH3}$$

$I_{mm}$: area of the peak (assigned to mm) appearing in 21.4 to 22.2 ppm $I_{CH3}$: area of the peak (assigned to mm, mr and rr) appearing in 19.0 to 22.4 ppm 7) Blockness (CSD):

The blockness (CSD) means a ratio of reactivity of ethylene to that of propylene and such a definition is described in *Copolymerization 1, Analysis of Reaction*, edited by The Society of Polymer Science, Japan, pages 5-13, published by Baifukan (1975). The calculation method was done in accordance with a method of Soga, K., Park, J. R., Shiono, T., *Polymer Communications*, Vol. 32, No. 10, page 310 (1991). Thus, the ratio of intensities of a, b, c, f, g and i of the $^{13}$C-NMR spectrum of FIG. 1 was used, and the calculation was done by the following equation.

Blockness $(CSD)=[(0.5 \times i+0.5 \times g+0.25 \times f) \times a]/[0.5 \times (b+c)]^2$ 8) Film Impact:

The film was sampled in a size of 10 cm×1 m and allowed to stand in a thermostatic chamber of −5° C. for 2 hours. After that, in this thermostatic chamber, a semispherical impact member having a radius of ½ inch was attached to a film impact tester manufactured by Toyo Seiki Seisaku-sho, Ltd. and then tests were carried out ten times for one sample to measure the impact energy. The value for the impact energy was divided by the thickness of the film and mean value of ten points was defined as a film impact and used as a yardstick for the impact resistance.

9) Tensile Elasticity (Young's Modulus):

In accordance with a method of JIS K7127, the tensile elasticity was measured for the mobile direction (MD) of the resin upon molding under the condition of a sample width of 20 mm, a chuck space of 250 mm and a tensile rate of 5 mm/minute.

10) Transparency:

The total haze was measured according to a method of JIS K7105.

11) Intrinsic Viscosity:

The measurement of intrinsic viscosity of a xylene-soluble matter was carried out by the following method. The sample (2.5 g) is placed in 250 ml of o-xylene and heated up to the boiling temperature with heating and stirring so as to completely dissolve during more than 30 minutes. After confirming the complete dissolution, the solution is allowed to cool with stirring to make not higher than 100° C. and then kept for 2 hours in a thermostatic chamber kept at 25° C. Thereafter, the component separated out therefrom is filtered off using a filter paper, and the filtrate is evaporated to dryness. The dried residue of the filtrate is subjected to measurement of the intrinsic viscosity [η] in decalin of 135° C.

2. Method for the manufacture of the resin compositions PP-1 to PP-10 (method for the manufacture by a multi-stage polymerization of the component (A) with the copolymer (B-1)) will be shown below. Their physical properties are shown in Table 1.

Manufacture of PP-1

1) Preparation of Solid Catalyst:

Anhydrous magnesium chloride (56.8 g) was completely dissolved in 100 g of anhydrous ethanol, 500 ml of Vaseline oil CP14N manufactured by Idemitsu Kosan Co., Ltd. and 500 ml of silicone oil KF96 manufactured by Shinetsu Silicone Co., Ltd. at 120° C. This mixture was stirred at 5,000 rpm for 2 minutes at 120° C. using a TK homomixer manufactured by Tokushu Kika Kogyo Co., Ltd. This was transferred to 2 liters of anhydrous heptane of not higher than 0° C. together with stirring. The resulting white solid was well washed with anhydrous heptane and dried in vacuo at room temperature, and the ethanol was partially removed therefrom in a nitrogen stream. The resulting magnesium chloride carrier was treated with titanium tetrachloride and dibutyl phthalate to give a catalyst for polymerization.

2) Preliminary Polymerization:

In a nitrogen atmosphere, 500 ml of n-heptane, 6.0 g of triethyl aluminum, 0.99 g of cyclohexylmethyl dimethoxysilane and 10 g of the catalyst for polymerization prepared in the above 1) were poured into a three-liter autoclave and stirred for 5 minutes at the temperature range of 0 to 5° C. After that, propylene was supplied into the autoclave so that 10 g of propylene were polymerized per gram of the polymerization catalyst, and the preliminary polymerization was carried out for 1 hour at the temperature range of 0 to 5° C. The resulting preliminary polymerization catalyst was washed with each 500 ml of n-heptane three times and used for the following polymerization.

3) Polymerization:

First Stage: Polymerization of Polypropylene

In a nitrogen atmosphere, 2.0 g of the preliminary polymerization solid catalyst prepared by the above method, 11.4 g of triethylaluminum and 1.88 g of cyclohexylmethyl dimethoxysilane were placed in an autoclave having an inner volume of 60 liters equipped with a stirrer, then 18 kg of propylene and hydrogen corresponding to 5,000 molar ppm to propylene were charged thereinto, temperature was raised up to 70° C., and polymerization was carried out for 1 hour. After 1 hour, unreacted propylene was removed to complete the polymerization.

Second Stage: Polymerization of Propylene-Ethylene Copolymer

After completion of the above first stage polymerization, the liquid propylene was removed, a mixed gas of ethylene/propylene (molar ratio: 24/74) was supplied at 75° C. at the rate of 2.2 Nm$^3$/hour, hydrogen was supplied so as to make 50,000 molar ppm to the total amount of ethylene, propylene and hydrogen, and the polymerization was carried out for 40 minutes. After 40 minutes, the unreacted gas was removed to complete the polymerization. As a result, 6.0 kg of polymer were obtained.

Manufacture of PP-2

First Stage: Polymerization of Polypropylene

In a nitrogen atmosphere, 2.0 g of the preliminary polymerization solid catalyst prepared by the above method, 11.4 g of triethylaluminum and 1.88 g of cyclohexylmethyl dimethoxysilane were placed in an autoclave having an inner volume of 60 liters equipped with a stirrer, then 18 kg of propylene and hydrogen corresponding to 6,500 molar ppm to propylene were charged thereinto, the temperature was raised up to 70° C., and the polymerization was carried out for 1 hour. After 1 hour, unreacted propylene was removed to complete the polymerization.

Second Stage: Polymerization of Propylene-Ethylene Copolymer

After completion of the above first stage polyermization, the liquid propylene was removed, a mixed gas of ethylene/propylene (molar ratio: 19/81) was supplied at 75° C. at the rate of 2.2 Nm$^3$/hour, hydrogen was supplied so as to make 20,000 molar ppm to the total amount of ethylene, propylene and hydrogen, and the polymerization was carried out for 60 minutes. After 60 minutes, the unreacted gas was removed to complete the polymerization. As a result, 5.8 kg of polymer were obtained.

Manufacture of PP-3

The same operation as above for the manufacture of PP-2 was carried out except that the second stage of the polymerization was carried out as follows.

Second Stage: Polymerization of Propylene-Ethylene Copolymer

After completion of the above first stage reaction, the liquid propylene was removed, a mixed gas of ethylene/propylene (molar ratio: 30/70) was supplied at 75° C. at the rate of 2.2 Nm$^3$/hour, hydrogen was supplied so as to make 23,000 molar ppm to the total amount of ethylene, propylene and hydrogen, and the polymerization was carried out for 35 minutes. After 35 minutes, the unreacted gas was removed to complete the polymerization. As a result, 6.0 kg of polymer were obtained.

Manufacture of PP-4

The same operation as above for the manufacture of PP-2 was carried out except that the second stage of the polymerization was carried out as follows.

Second Stage: Polymerization of Propylene-Ethylene Copolymer

After completion of the above first stage polymerization, the liquid propylene was removed, a mixed gas of ethylene/propylene (molar ratio: 30/70) was supplied at 75° C. at the rate of 2.2 Nm$^3$/hour, hydrogen was supplied so as to make 50,000 molar ppm to the total amount of ethylene, propylene and hydrogen, and the polymerization was carried out for 35 minutes. After 35 minutes, the unreacted gas was removed to complete the polymerization. As a result, 5.7 kg of polymer were obtained.

Manufacture of PP-5

The same operation as above for the manufacture of PP-1 was carried out except that in the second stage of the polymerization, hydrogen was supplied so as to make 43,000 molar ppm to the total amount of ethylene, propylene and hydrogen. As a result, 6.1 kg of the polymer was obtained.

Manufacture of PP-6

The same operation as above for the manufacture of PP-1 was carried out except that in the second stage of the polymerization, hydrogen was supplied so as to make 100,000 molar ppm to the total amount of ethylene, propylene and hydrogen, and the polymerization was carried out for 40 minutes. As a result, 6.1 kg of the polymer was obtained.

Manufacture of PP-7

The same operation as above for the manufacture of PP-1 was carried out except that the second stage of the polymerization was carried out as follows.

Second Stage: Polymerization of Propylene-Ethylene Copolymer

After completion of the above first stage polymerization, the liquid propylene was removed, a mixed gas of ethylene/propylene (molar ratio: 30/70) was supplied at 75° C. at the rate of 2.2 Nm$^3$/hour, hydrogen was supplied so as to make 5,000 molar ppm to the total amount of ethylene, propylene and hydrogen, and the polymerization was carried out for 35 minutes. After 35 minutes, the unreacted gas was removed to complete the polymerization. As a result, 6.2 kg of polymer were obtained.

Manufacture of PP-8

First Stage: Polymerization of Polypropylene

In a nitrogen atmosphere, 2.0 g of the preliminary polymerization solid catalyst prepared by the above method, 11.4 g of triethylaluminum and 1.88 g of cyclohexylmethyl dimethoxysilane were placed in an autoclave having an inner volume of 60 liters equipped with a stirrer, then 18 kg of propylene, 120 liters of ethylene and hydrogen corresponding to 6,500 molar ppm to propylene were charged thereinto, the temperature was raised up to 70° C., and the polymerization was carried out for 1 hour. After 1 hour, unreacted propylene was removed to complete the polymerization.

Second Stage: Polymerization of Propylene-Ethylene Copolymer

After completion of the above first stage polymerization, the liquid propylene was removed, a mixed gas of ethylene/propylene (molar ratio: 30/70) was supplied at 75° C. at the rate of 2.2 Nm$^3$/hour, hydrogen was supplied so as to make 50,000 molar ppm to the total amount of ethylene, propylene and hydrogen, and the polymerization was carried out for 30 minutes. After 30 minutes, the unreacted gas was removed to complete the polymerization. As a result, 6.0 kg of polymer were obtained.

Manufacture of PP-9

The same operation as above for the manufacture of PP-8 was carried out except that in the first stage of the polymerization, 60 liters of ethylene were charged, and in the second stage of the polymerization, the polymerization time was made 35 minutes. As a result, 6.7 kg of the polymer was obtained.

Manufacture of PP-10

The same operation as above for the manufacture of PP-9 was carried out except that in the first stage of the polymerization, 250 liters of ethylene were supplied, and in the second stage of the polymerization, the polymerization time was made 25 minutes. As a result, 6.7 kg of the polymer was obtained.

3. Ethylene/Propylene Copolymer (B-2):

As the ethylene/propylene copolymer (B-2), there were used Tafrner P180, Tafmer P480 and Tafmer P880 (all manufactured by Mitsui Chemicals, Inc.).

4. Method for the Manufacture of Polypropylene Resin Composition:

Examples 1 to 6 and Comparative Examples 1 to 4

The components were mixed in such amounts as shown in Table 1, and 100 parts by weight of this mixture were compounded with 0.30 parts by weight of a phenolic antioxidant and 0.1 parts by weight of calcium stearate. The mixture was mixed at room temperature for 3 minutes using a Henschel mixer and then subjected to melt-kneading using a uniaxial extruder having a screw diameter of 40 mm (cylinder temperature: 210° C.) to give a polypropylene resin composition.

Manufacture of Film:

A uniaxial extruder (manufactured by Yoshii Tekko Co., Ltd.) having a diameter of 25 mm equipped with a T die was used under the condition of a die temperature of 260° C., a cylinder temperature of 260° C. and a chill roll temperature of 50° C. at the screw revolutions as shown in the table to give a film having a thickness of about 70 μm.

The results of the measurement of the physical properties are also shown in Table 1.

TABLE 1

|  | Example 1 | Example 2 | Example 3 | Example 4 | Example 5 |
|---|---|---|---|---|---|
| Component (A) | 1st stage of PP1 | 1st stage of PP2 | 1st stage of PP3 | 1st stage of PP4 | 1st stage of PP8 |
| [η]A (dl/g) | 2.8 | 3.3 | 3.3 | 3.3 | 3.3 |
| Comonomer content (wt %) | 0 | 0 | 0 | 0 | 4 |
| [mm] (%) | 98 | 98 | 98 | 98 | 98 |
| Amount (wt %) | 73 | 75 | 75 | 72 | 75 |
| Copolymer (B-1) | 2nd stage of PP1 | 2nd stage of PP2 | 2nd stage of PP3 | 2nd stage of PP4 | 2nd stage of PP8 |
| [η](B-1) (dl/g) | 3.1 | 3.4 | 4.3 | 3.3 | 3.3 |
| Comonomer content (wt %) | 55 | 68 | 53 | 53 | 53 |
| Amount (wt %) | 22 | 20 | 20 | 18 | 20 |
| Copolymer (B-2) | Tafmer P P0180 | Tafmer P P0180 | Tafmer P P0180 | Tafmer P P0480 | Tafmer P P0180 |
| [η](B-2) (dl/g) | 1.8 | 1.8 | 1.8 | 2.5 | 1.8 |
| Propylene content (wt %) | 25.6 | 25.6 | 25.6 | 25.6 | 25.6 |
| Heterologous bond | detectable | detectable | detectable | detectable | detectable |
| Mw/Mn | 2.1 | 2.1 | 2.1 | 2.5 | 2.1 |
| CSD | 0.51 | 0.51 | 0.51 | 0.59 | 0.51 |
| Amount (wt %) | 5 | 5 | 5 | 10 | 5 |
| [η](B-1)/[η](A) | 1.1 | 1.0 | 1.3 | 1.0 | 1.0 |
| [η](B-2)/[η](A) | 0.6 | 0.5 | 0.5 | 0.8 | 0.5 |
| [η](B-1)/[η](B-2) | 1.7 | 1.9 | 2.4 | 1.3 | 1.8 |
| (B-1)/(B-2) | 4.4 | 4.0 | 4.0 | 1.8 | 4.0 |
| Screw rotation speed (rpm) | 50 | 90 | 50 | 50 | 50 |
| Average length (μm) | 1.8 | 1.6 | 1.7 | 1.8 | 2.7 |
| Low temp. Impact strength (J/mm) | 15.2 | 14.7 | 18.5 | 15.2 | 30.6 |
| Young's modulus (MPa) | 620 | 560 | 630 | 590 | 440 |
| Heat seal strength (N/15 mm) | 48 | 58 | 60 | 58 | 63 |
| Total Haze (%) | 10.9 | 21.8 | 24 | 23.6 | 12 |
| Internal haze (%) | 2 | 3.4 | 3.3 | 3.1 | 2.1 |
| FE | not Exist | not Exist | not Exist | not Exist | not Exist |
| Average aspect ratio | 9.0 | 8.3 | 8.5 | 7.5 | 11.0 |

|  | Example 6 | Co. example 1 | Co. example 2 | Co. example 3 | Co. example 4 |
|---|---|---|---|---|---|
| Component (A) | 1st stage of PP9 | 1st stage of PP6 | 1st stage of PP5 | 1st stage of PP7 | 1st stage of PP10 |
| [η]A (dl/g) | 3.3 | 2.8 | 2.8 | 2.8 | 3.3 |
| Comonomer content (wt %) | 2 | 0 | 0 | 0 | 8 |
| [mm] (%) | 98 | 98 | 98 | 98 | 98 |
| Amount (wt %) | 80 | 73 | 75 | 75 | 75 |
| Compolymer (B-1) | 2nd stage of PP9 | 2nd stage of PP6 | 2nd stage of PP5 | 2nd stage of PP7 | 2nd stage of PP10 |
| [η](B-1) (dl/g) | 3.3 | 2.1 | 3.3 | 4.9 | 3.3 |
| Comonomer content (wt %) | 53 | 55 | 47 | 53 | 53 |
| Amount (wt %) | 15 | 22 | 25 | 20 | 20 |
| Copolymer (B-2) | Tafmer P P0180 | Tafmer P P0880 | non | Tafmer P P0180 | Tafmer P P0180 |
| [η](B-2) (dl/g) | 1.8 | 3.1 | — | 1.8 | 1.8 |
| Propylene content (wt %) | 25.6 | 26.7 | — | 25.6 | 25.6 |
| Heterologous bond | detectable | detectable | — | detectable | detectable |
| Mw/Mn | 2.1 | 2.4 | — | 2.1 | 2.1 |
| CSD | 0.51 | 0.66 | — | 0.51 | 0.51 |
| Amount (wt %) | 5 | 5 | 0 | 5 | 5 |
| [η](B-1)/[η](A) | 1.0 | 0.8 | 1.2 | 1.8 | 1.0 |
| [η](B-2)/[η](A) | 0.5 | 1.1 | — | 0.6 | 0.5 |
| [η](B-1)/[η](B-2) | 1.8 | 0.7 | — | 2.7 | 1.8 |
| (B-1)/(B-2) | 3.0 | 4.4 | — | 4.0 | 4.0 |
| Screw rotation speed (rpm) | 50 | 90 | 90 | 50 | 50 |
| Average length (μm) | 2.3 | 0.6 | 1.3 | 0.7 | 2.9 |
| Low temp. Impact strength (J/mm) | 23 | 7.9 | 12.7 | 7.6 | 32 |
| Young's modulus (MPa) | 480 | 700 | 700 | 750 | 340 |

TABLE 1-continued

| | | | | | |
|---|---|---|---|---|---|
| Heat seal strength (N/15 mm) | 60 | 30 | 34 | 48 | 43 |
| Total Haze (%) | 14 | 32 | 30.4 | 83 | 11 |
| Internal haze (%) | 2.6 | 4.3 | 4 | 7.3 | 2.4 |
| FE | not Exist | not Exist | not Exist | Exist | not Exist |
| Average aspect ratio | 8.0 | 2.5 | 5.5 | 2.0 | 12.0 |

In accordance with the invention, it is now possible to provide a polypropylene resin composition which is not affected by molding machines and molding conditions upon molding, does not generate fish eye and the like, shows excellent appearance and transparency and is excellent in impact resistance at low temperatures, heat resistance and rigidity and also to provide a molding thereof.

The invention claimed is:

1. A polypropylene resin composition comprising:
   a) from 40 wt % to 80 wt % of component A selected from a propylene homopolymer or a propylene copolymer comprising at most 5 wt % of a comonomer selected from ethylene, a $C_{4-12}$ α-olefin, or mixtures thereof; and
   b) from 20 wt % to 60 wt % of component B comprising B-1 and B-2, wherein B-1 is a copolymer of propylene with ethylene having a propylene content from 55 wt % to 85 wt %, and B-2 is a propylene copolymer comprising 15 wt % to 50 wt % of propylene, comprising a comonomer selected from ethylene, a $C_{4-12}$ α-olefin, or mixtures thereof; and having a molecular weight distribution by gel permeation chromatography of 3.0 or less and a blockness by NMR of 0.8 or less;
   wherein the composition comprises at least 3 wt % of B-2, and has an intrinsic viscosity ratio of B-1 to A at most of 1.5 and an intrinsic viscosity ratio of B-1 to B-2 at least 0.8.

2. The composition of claim 1, having a weight ratio of B-1 to B-2 from 1.2 to 6.0.

3. The composition of claim 1, wherein B-2 comprises 15 wt % to 35 wt % of propylene.

4. The composition of claim 1, wherein A has a stereoregularity of at least 96%.

5. The composition of claim 1, wherein B is dispersed as layers or as needles in A, and an average length of the dispersed layer is 1.5 μm or longer.

6. A molding comprising the composition of claim 1.

7. A film comprising the composition of claim 1.

* * * * *